United States Patent

Nilsson et al.

[11] 4,030,382
[45] June 21, 1977

[54] SHARPENING DEVICE FOR STEEL SKI EDGE STRIPS

[75] Inventors: Sven A. Nilsson; Christian Melin, both of Eskilstuna, Sweden

[73] Assignee: C O Oberg & Co AB, Eskilstuna, Sweden

[22] Filed: Mar. 1, 1976

[21] Appl. No.: 662,548

[52] U.S. Cl. .................................. 76/83; 76/88; 51/205 WG
[51] Int. Cl.² ................................. B21K 17/00
[58] Field of Search ............ 76/83, 88; 51/205 WG; 280/11.37 T

[56] References Cited

UNITED STATES PATENTS

| 493,174 | 3/1893 | McClure | 76/83 |
| 1,021,128 | 3/1912 | Brecker | 76/88 |

*Primary Examiner*—Al Lawrence Smith
*Assistant Examiner*—James G. Smith
*Attorney, Agent, or Firm*—Pierce, Scheffler & Parker

[57] ABSTRACT

A sharpening device for steel edge strips on skis which comprises a generally straight file blade and a holder for bending this blade, to limit its cutting action to a few teeth at a time.

3 Claims, 5 Drawing Figures

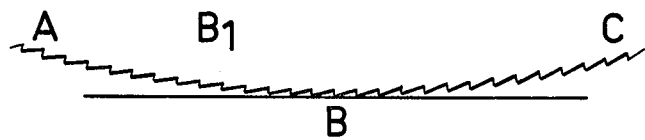
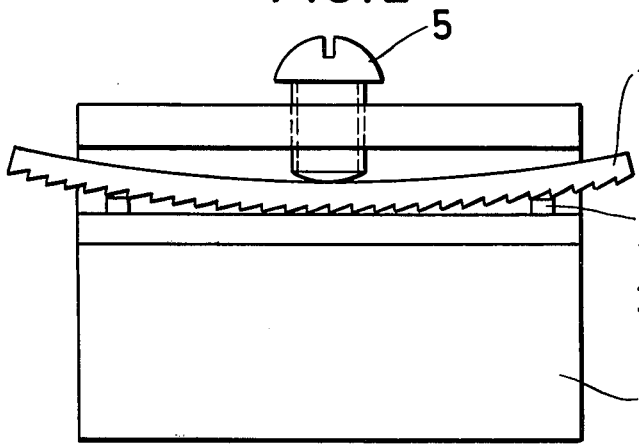
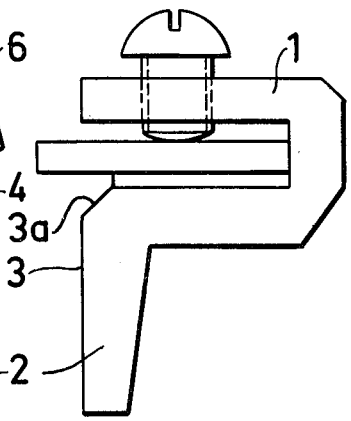
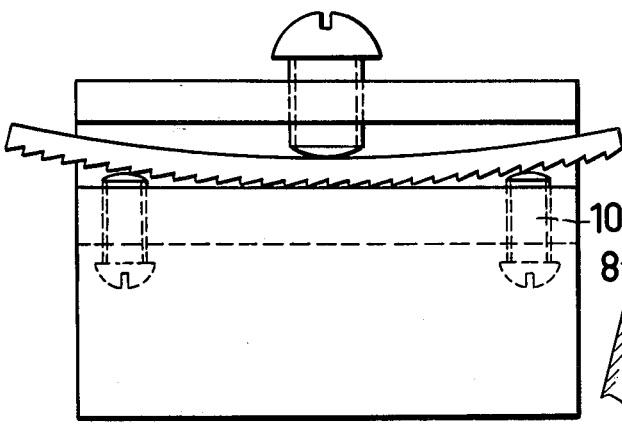
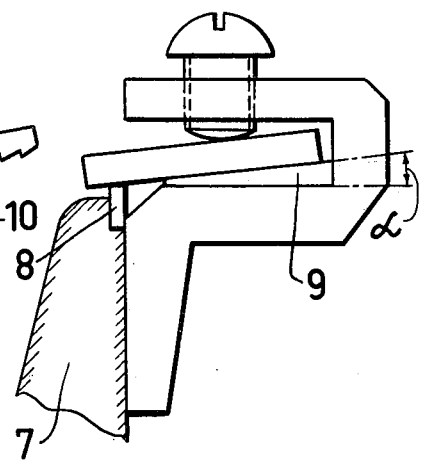

SHARPENING DEVICE FOR STEEL SKI EDGE STRIPS

The present invention relates to a sharpening device and more particularly to a device for filing steel edge strips on skis.

The ever-increasing demands on skis for downhill skiing have been met i.a. by the provision of steel-edged skis, which will give the skier a better control. It is important that the strip edges are sharp and well-defined for giving a sure hold in the snow, and for this purpose it has proved advantageous to file or whet the edges while maintaining a good surface finish.

To make possible the filing of the steel edge strips to a correct geometric shape and for obtaining a desired angle between the running surface of the ski and the flank surface of the steel strip special file holders have been designed. These known file holders are not satisfactory, however, since they do not permit a straight filing tool to assume a curved shape, and further do not permit variation of the edge angle of the steel strip.

These shortcomings have been eliminated in a sharpening device which comprises a generally U-shaped holder for a file blade projecting therefrom by one longitudinal edge and a clamping member for securing the file blade to the holder as well as a guide flange extending substantially at right angles to the file-supporting surface. According to the invention the holder is equipped with two spaced supports for the file blade between which the clamping member can act against the middle portion of the file blade, to bend the blade into a convex shape and for making said middle portion of the file blade engage the file-supporting surface.

By this device a somewhat convex shape of the working surface of the file blade is obtained, and this will make the penetration of the file teeth into the workpiece easier. This is highly desirable in surfaces of the hardness required for ski edge steel strips. The active surface of the file blade can be more efficiently used in this way, since the cutting spot can be varied by tilting the holder about a transverse axis.

Embodiments of the invention will be described now with reference to the drawing. In the drawing FIG. 1 illustrates the principle of sharpening,
FIG. 2 is an elevation view of a sharpening device and
FIG. 3 is an end view,
FIG. 4 is an end view of a second embodiment and
FIG. 5 an elevation view of a third embodiment.

In FIG. 1 there is illustrated diagrammatically how the convex-bent working surface A-C of a file blade engages a workpiece at B. By tilting the file blade longitudinally, the latter can be made to work by its portion $B_1$, for example, instead. In this manner a larger portion of the file blade can be used, and successive groups of sharp file teeth will become active. The penetration of the file teeth into the surface is made possible by the convex curved shape of the file blade which will only permit a small number of teeth to cut at any time.

FIGS. 2 and 3 illustrate a sharpening device working according to this principle. The main body of the sharpening device is a generally U-shaped holder 1, the lower shank of which has a depending flange 2 with a flat lateral surface 3 substantially at right angles to the shank. At the inside of the lower shank two spaced support ribs 4 are provided, one close to each end of the holder. A strong clamping screw 5 engages a threaded hole in the upper shank mid-between the ribs 4. A file blade 6 supported by the ribs 4 can be bent into a curved shape through the tightening of the clamping screw 5 as illustrated in FIG. 2. The depth of the gap between the shanks is so related to the width of the file blade, that the latter projects transversely from the holder by a certain amount as seen in FIG. 3. The height of the ribs 4 permits the file blade to be deformed so as to abut against the lower shank between the ribs 4, thus improving the rigidity of the assembly. The flat surface 3 of the flange 2 at the lower holder shank affords a guide for the running suface of a ski 7 (FIG. 4), the steel edge strip 8 of which is operated on with the file blade 6. By virtue of this guiding action the edge angle of the strip will become sharp and well-defined. For improving the conditions of use the surface 3 is chamfered as at 3a to form a space for the file cuttings between the file blade 6, the surface 3a and the ski 7 (as illustrated in FIG. 4).

In the embodiment illustrated in FIG. 4 the ribs 4 are replaced by wedge-shaped exchangeable elements 9 having such a wedge angle $\alpha$ that the edge angle of the steel strip 8 will become somewhat less than 90° through sharpening. This angle can be modified by substituting elements 9 having another wedge angle. An angle less than 90° is adopted mostly by advanced skiers.

FIG. 5 illustrates a modification where the supporting elements are set screws 10. By this arrangement it will become possible to vary the curvature of the file blade.

Common to the embodiments illustrated and described is a cross-section shape of the holder which makes it well suited for manufacture by extrusion methods. The rigidness of the holder will be increased by the flange 2.

What we claim is:

1. A sharpening device particularly for sharpening steel edge strips on skis and comprising a generally U-shaped holder for a generally straight blade with one longitudinal edge projecting from the holder and clamping means for securing the file blade to the inside of a first U-shank, the latter having a guide flange depending substantially at right angles therefrom, the improvement being the provision of two spaced supports for the file blade, at the inside of said first U-shank, said clamping means being a clamping screw received by a second U-shank and being located between said supports to cause upon actuation the bending of the file blade into a convex shape abutting said first U-shank between said supports.

2. A sharpening device according to claim 1, said supports being exchangeable wedges for giving a sideways slant to the file blade.

3. A sharpening device according to claim 1, said supports comprising adjustable screw members passing through said first U-shank.

* * * * *